(12) United States Patent
Sako

(10) Patent No.: US 7,181,405 B1
(45) Date of Patent: Feb. 20, 2007

(54) ELECTRONIC TENDER SYSTEM

(75) Inventor: Kazue Sako, Tokyo (JP)

(73) Assignee: NEC Corporation, Tokyo (JP)

( * ) Notice: Subject to any disclaimer, the term of this patent is extended or adjusted under 35 U.S.C. 154(b) by 752 days.

(21) Appl. No.: 09/472,900

(22) Filed: Dec. 28, 1999

(30) Foreign Application Priority Data

Dec. 28, 1998 (JP) ............................... 10-374833

(51) Int. Cl.
*G06Q 10/00* (2006.01)
(52) U.S. Cl. .......................................... 705/1; 705/30
(58) Field of Classification Search ............ 705/35–37, 705/1, 10, 26, 5
See application file for complete search history.

(56) References Cited

U.S. PATENT DOCUMENTS

| 5,375,055 A | * | 12/1994 | Togher et al. | ................. | 705/37 |
| 5,826,244 A | * | 10/1998 | Huberman | .................... | 705/37 |
| 6,014,627 A | * | 1/2000 | Togher et al. | .................. | 705/1 |
| 6,023,685 A | * | 2/2000 | Brett et al. | ..................... | 705/37 |
| 6,044,363 A | * | 3/2000 | Mori et al. | ..................... | 705/37 |
| 6,055,518 A | * | 4/2000 | Franklin et al. | .............. | 705/37 |
| 6,397,197 B1 | * | 5/2002 | Gindlesperger | .............. | 705/37 |

FOREIGN PATENT DOCUMENTS

JP        2-118876        5/1990

OTHER PUBLICATIONS

Dialog File 148: "Two Technologies Converge on the Internet Providing Users Needed Mobility", PR Newswire, p121, Dec. mb 17, 1997.*
Dialog File 148: "CompUSA Inc. Launches Online Auction Site; Computer Superstore Offers Clearance Items to Highest Bidder", PR Newswire, Jun. 7, 1999.*
"Electronic Auctions with Private Bids", Proceedings of the 3rd USENIX Workshop on Electronic Commerce, Sep. 3, 1998.*
Kikuchi, Hiroaki et al., "Multi-Round Anonymous Auction Protocols", *IEICE Transaction on Information and Systems, vol. E82-D, No. 4, The Institute of Electronics, Information and Communication Engineers*, (Apr. 4, 1999).
Hiroaki Kikuchi et al., Multi-round Anonymous Auction Protocols, Computer Science Department, Carnegie Mellon university.

* cited by examiner

*Primary Examiner*—John G. Weiss
*Assistant Examiner*—Michael Fisher
(74) *Attorney, Agent, or Firm*—Foley & Lardner LLP

(57) ABSTRACT

A coding function section in a bidder sub-system is supplied with a code parameter that corresponds to a bid to be offered, and the bid is coded using the code parameter. A tender opening system decodes received bids using a decode parameter corresponding to a highest or lowest bid amount in a predetermined bid range, and any bid that is successfully decoded using the decode parameter is accepted as the contract price. If no bid is decoded using the decode parameter of the highest/lowest amount of the range, the tender opening system attempts to decode all bids using the decode parameter of the next highest/lowest bid in the range. In this manner information regarding unaccepted bids is kept confidential by not publishing the decode parameters concerning the bids inferior to the winning bid.

14 Claims, 3 Drawing Sheets

ELECTRONIC TENDER SYSTEM

BACKGROUND OF THE INVENTION

The present invention relates to an electronic tender system, and particularly to a method for coding a bid and a method for deciding a contract price.

As known from Japanese Patent Laid-Open No. HEI2-118876, for example, an electronic tender system uses coding technology because the bid information should be kept confidential until the tender opening. All coded bid information is decoded at the tender opening to decide the highest or the lowest bid as the contract price. The announcement of all bids allows all bidders to confirm that the contact price has been decided correctly, in other words, it was the highest or the lowest price among the bids.

Recently, it has become important not to publish the unaccepted bids because of privacy concerns. To meet this requirement, for example, an approach has been disclosed in an article, "Multi-round Anonymous Auction Protocols" by Kikuchi, Harkavy and Tyger, published. in "IEEE Workshop on Dependable and Real-time E-Commerce System". This approach disclosed in the prior art literature is shown in FIG. 1.

In this approach, the bidder creates a data row corresponding to a series indicating bids at successive bid prices. If the bidder wishes to offer a bid at a given price, the bidder's ID is supplied in correspondence to that price. If the bidder does not wish to offer a bid at a given price, a value 0 is supplied in correspondence to that price. This series of data forms a data row. Each data row is encoded. The opener receives encoded data rows transmitted by all bidders, adds them together and then decodes the sum to determine the contract price. In this approach, as the code string data of individual bidder is not decoded, the bid of respective bidder can be kept secret, and at the same time, the identification information of the highest price bidder can be extracted from the sum of the data rows.

Now, the principle of identification extraction will be described. A bidder having an identification information IDi, creates a data row corresponding to his bids as follows. Suppose the tender reception range be (a, b) and his bid a+v(<b), then (v+1) times the bidder's ID are concatenated. This indicates that the bidder is willing to bid at each corresponding amount. Next, the value 0 is concatenated b−(a+v) times. This indicates that the bidder is not willing to bid at any of the corresponding amounts. Thus, a data row containing (b−a+1) elements is generated.

A data row is then created from each received data row, in which the respective elements of each received data row are added. In the resulting data row, if the element where 0 appears first is labeled as the $t^{th}$ element, the highest bid (contract price) is the bid corresponding to the a+t−1 element, and the winning bidder has identification information in that bidder's data row for the bid corresponding to the t−1 st element.

However, in this prior art, the bid data becomes longer in proportion to the tender reception price range, because the data row is created in proportion to the length of the tender reception range, and then it is divided to code. Further, when a plurality of bidders have offered the contract price, it is impossible to determine the identification or the number of concerned bidders, because the IDs of the winning bidders have been added together.

SUMMARY OF THE INVENTION

It is therefore an object of the present invention to provide an electronic tender system that reduces the amount of bid data, and at the same time, that identifies the winning bidders even when a plurality of bidders have offered the contract price, and moreover, to maintain the confidentiality of bid information for bids other than those of the successful bidders.

Other objects of the present invention will become clear as the description proceeds.

The electronic tender system according to the present invention is characterized in that a code parameter corresponding to a bid is delivered to a coding function section of a bidder sub-system. A contract price candidate selection function selects a candidate price, and a retrieve function retrieves a decode parameter corresponding to the candidate price that is used to determine whether the candidate contract price is matched in a tender opening section. The use of code parameters and decode parameters that correspond to candidate contract prices allows a bid price to be known only if the bid is identical to a contract price candidate. Therefore, the highest or the lowest bid and its bidder can be determined by examining in sequence whether there is a bid identical to a contract price candidate and incrementing or decrementing the contract price candidate with respect to the possible highest price or the lowest price. Bids submitted by other bidders can be concealed in this manner.

DETAILED DESCRIPTION OF THE PREFERRED EMBODIMENTS

Figure 1:
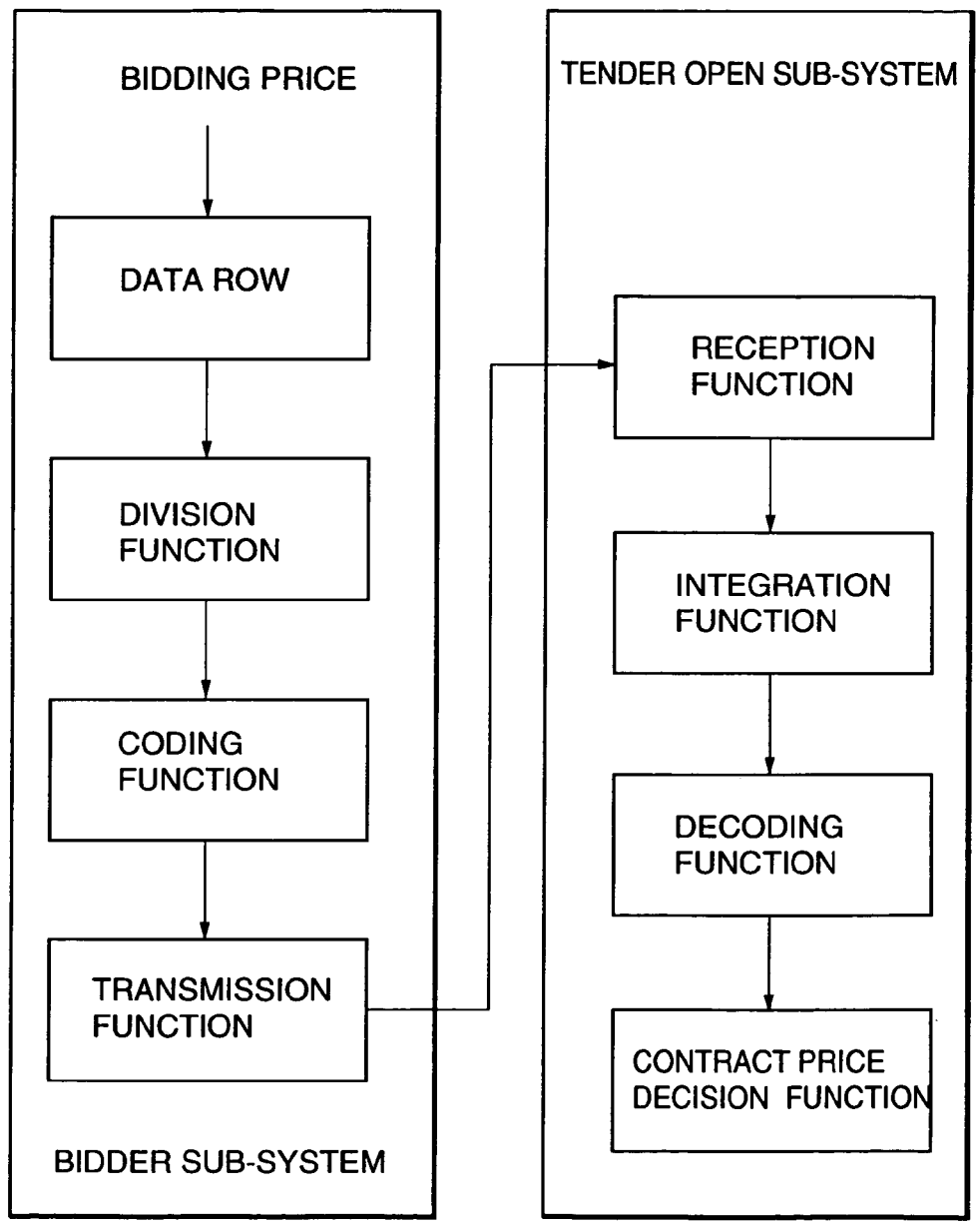
FIG. 1 is a block diagram showing a conventional method.
Figure 2:
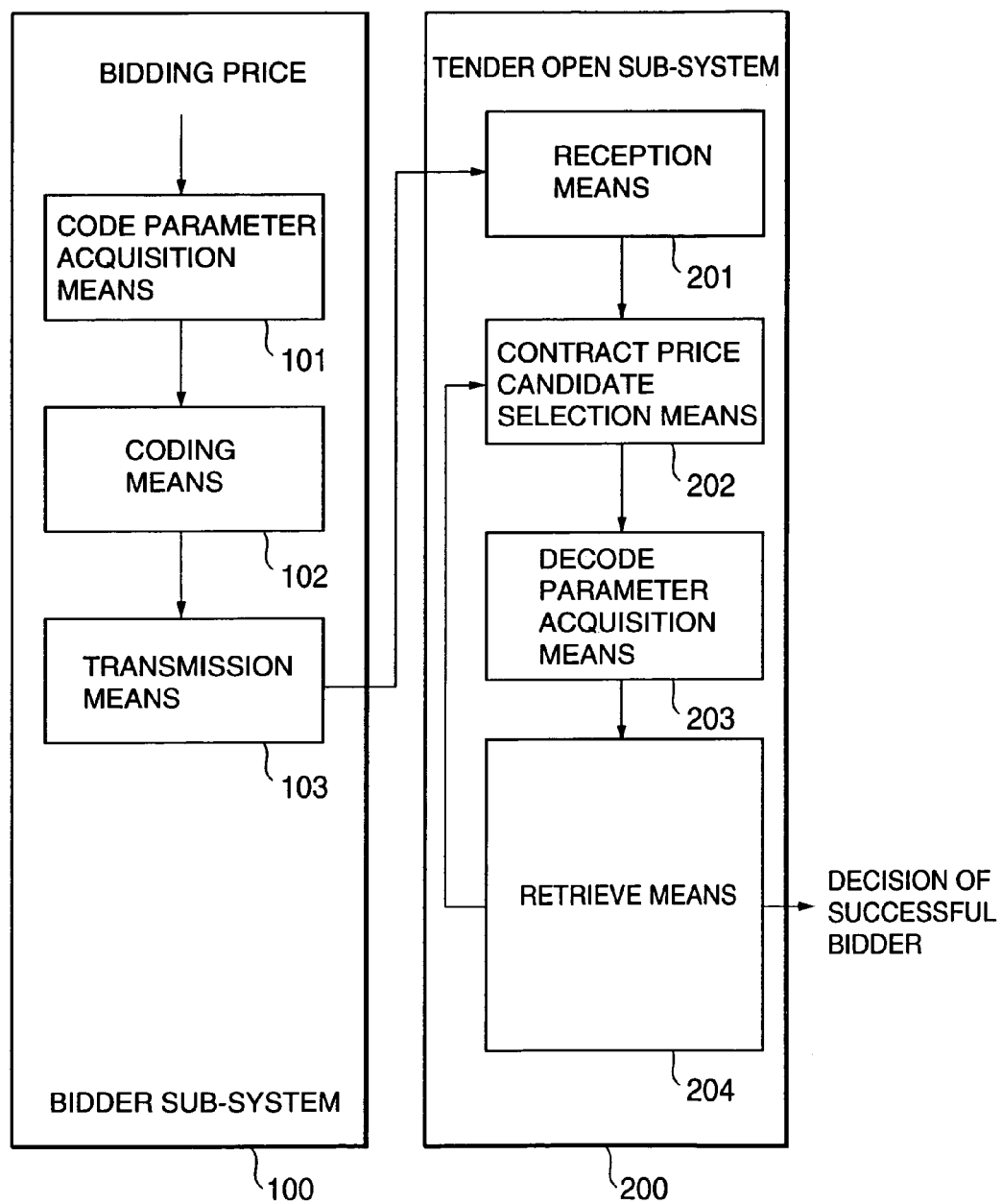
FIG. 2 is a block diagram showing a composition of the present invention.
Figure 3:
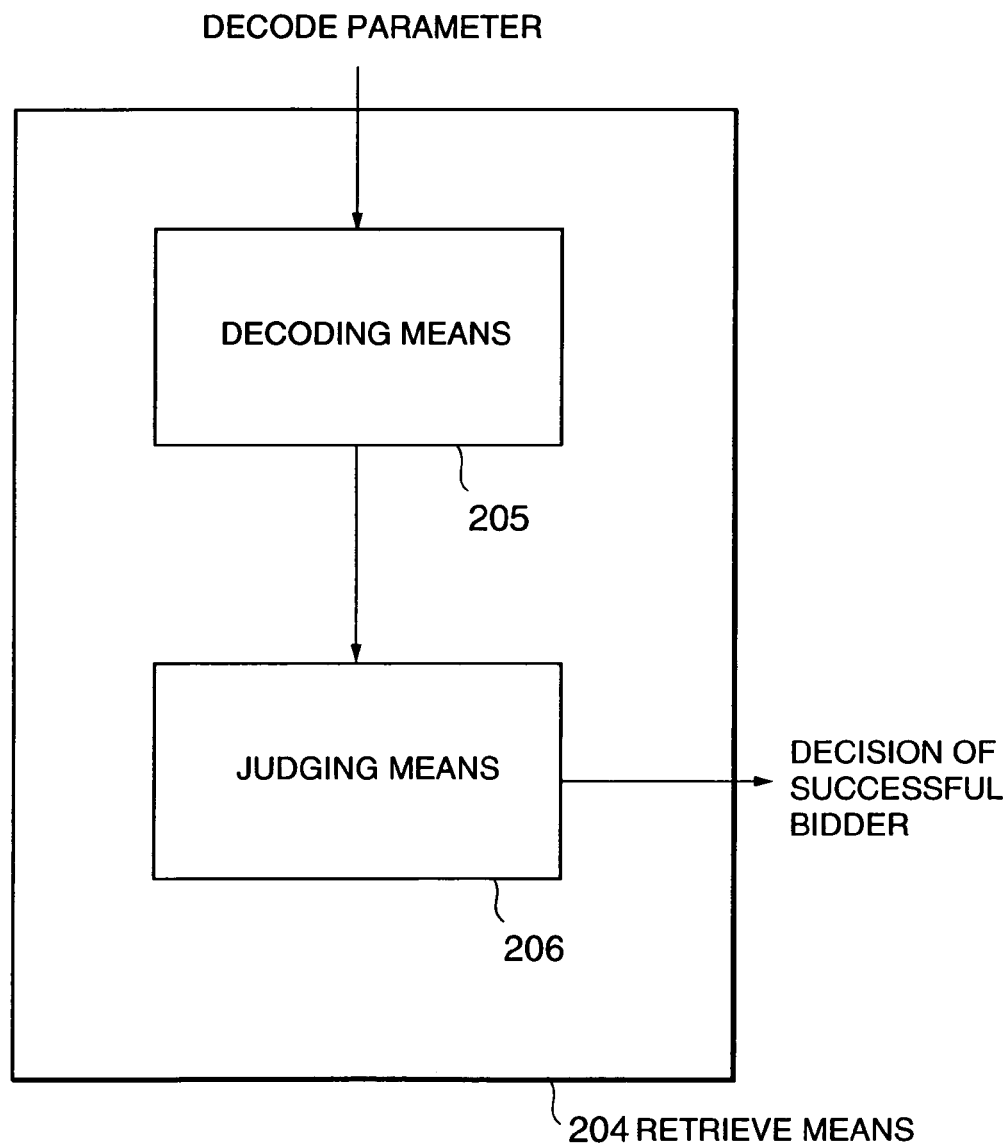
FIG. 3 is a block diagram showing a composition of the retrieve section of the present invention.

Referring now to FIGS. 2 and 3, description will proceed to an electronic tender system according to a preferred embodiment of the present invention.

FIG. 2 is a block diagram showing an embodiment of the present invention. The electronic tender system according to the present invention comprises a bidder sub-system 100 and a tender opening sub-system 200. The bidder sub-system 100 includes a code parameter acquisition section 101 and a coding section 102, while the tender opening sub-system 200 includes a reception section 201, a contract price candidate selection section 202, a decode parameter acquisition section 203 and a retrieve section 204.

The retrieve section 204 includes, as shown in FIG. 3, a decoding section 205 and a judgment section 206. The decoding section 205 sequentially decodes coded bids received by the reception section 201 using a decode parameter corresponding to a candidate bid that is acquired by the decode parameter acquisition section 205. The judgment section 206 determines that a decoded bid is identical to the contact price candidate selected by the selection section 202 when the decoding result produced by the decoding section 205 is a predetermined value.

Note that, in this embodiment, to simplify the description, it is supposed, hereinafter, that a bidder subsystem that has offered the highest price, among bid prices, will be decided as the successful bidder, though it is similar in the case where the lowest price will be the successful bid that determines the contract price.

The input to the bidder sub-system 100 is the bid desired by the bidder sub-system. The bid by this bidder sub-system 100 is delivered to the code parameter acquisition section 101. In the code parameter acquisition section 101, a code parameter that is used by the coding section 102 and that corresponds to the amount of this bid is acquired and delivered to the coding section 102. The coding section 102 performs the coding operation based on the supplied code parameter, and delivers the coded bidding data to the transmission section 103. The transmission section 103 transmits the coded bidding data to the reception section 201 of the tender opening sub-system 200.

The reception section 201 of the tender opening sub-system 200 receives the coded bidding data sent from bidder sub-system 100 and directs the contract price selection section 202 to begin a tender opening process on the tender opening day. The contract price selection section 202 directed to open the tender first takes the highest price within the acceptable range as a candidate price, and supplies the decode parameter acquisition section 203 with the candidate price.

The decode parameter acquisition section 203 acquires the decode parameter corresponding to the candidate price and delivers the decode parameter to the retrieve section 204. The retrieve section 204 decodes all coded bidding data received using the supplied decode parameter in the decoding section 205, and the judgment section 206 determines whether there is any bid among the coded bidding data that is the same as the candidate price. If a matching bid is determined, the bid of the bidder sub-system that sent the corresponding coded bidding data will be accepted. If there is no coded bidding data having the candidate price as its bid, the retrieve section 204 outputs that the candidate price is not the contract price to the contract price selection section 202.

Upon the reception of this output from the retrieve section 204, the contract price selection section 202 takes the next lower price than the current candidate price as a new candidate price, and delivers the new candidate price to the decode parameter acquisition section 203. Then, operations as previously described will be repeated until the judging section 206 detects a successful bidder, or the candidate price becomes lower than the tender range. If the candidate price becomes lower than the tender range, it is judged that no bid is accepted, and this result is output before terminating the processing.

Now, as an example of this embodiment, the case where an El Gamal code is used as a coding function will be described. Since the El Gamal code is well known by those skilled in the art and is incidental to the present invention, its detailed explanation will be omitted.

First, the tender opening system creates a large prime p and a generator g. In addition, a secret key $x(v)$, a public key $y(v)$ and a constant $M(v)$ for a respective bid v are decided. Here, the secret key $x(v)$ and the public key $y(v)$ present the following relation. $M(v)$ may be an arbitrary value, and for example, v and its hash value can be linked as $M(v)$, or may be a constant independent of v. As code parameters, $M(v)$ and $y(v)$ are adopted as code parameters and $x(v)$ is adopted as a decode parameter. The code parameters are published, while the decode parameters are kept confidential in the tender opening sub-system.

The bidder sub-system 100 obtains the code parameters $M(v)$ and $y(v)$ that correspond to a bid v to be made, and codes $M(v)$ with the public key $y(v)$ based on the El Gamal code. The El Gamal code, belonging to the code type called probabilistic encryption, is known to produce a different coded message even if the same $M(v)$ is coded. The bidder sub-system 100 sends this coding result to the tender opening system 200 as coded bidding data $C(v)$.

The tender opening sub-system 200 obtains a decode parameter $x(v')$ for a contract price candidate v' and decodes $C(v)$ using this decode parameter as the secret key. If v=v' obviously the decoding result will be $M(v)=M(v')$. On the contrary, if v v', the decoding result will not be $M(v')$. Thus, without revealing the bid, it can be determined whether the bid is equal to the contract price candidate.

If the contract price is decided to be v, all offered code bids, and the decode parameter $x(v)$ corresponding the possible bidding prices that are equal to or larger than v are published by the announcement section. Therefore, all bidders can verify that there was no bid larger than v and can determine who has bid the contract price, since each bidder can attempt to decode all offered coded bids using the announced decode parameter.

On the other hand, bids inferior to the contract price can be concealed, as the decode parameters $x(v)$ corresponding to the bids that are less than the contract price are not published. Further, problems in the case where a plurality of successful bidders exist as in the conventional method will not occur, because all bidding sub-systems will be identified, even when obviously a plurality of bidding subsystems have offered the contract price.

As another specific embodiment, a case where RSA code is used for coding function will be described. The detailed description of the RSA code will be omitted as it is well known by those skilled in the art and is incidental to the present invention. For RSA coding, a code parameter $y(v)$ is generated automatically from the bid v, without table lookup, and moreover, the fixed value $M(v)$ to be coded may not be fixed for all bidders.

First, the tender opening system generates large primes p and q, and determines their product n. The bidder sub-system generates the code parameter $M(v)$, $y(v)$, for the bid v it wishes to offer. That is to say, it generates random numbers, and makes $M(v)$ be the concatenation of v, and this random number, and the hash value where they are coupled. Next, $y(v)$, 1 is concatenated with the hash value of v, making it prime to $(p-1)(q-1)$.

Then, $M(v)$ is codified with the public key $y(v)$ based on the RSA code of the modulus n. In this case, as different random numbers are generated for respective bidders, different coded messages are generated even if a same v is coded. The bidder sub-system transmits this coding result to the tender opening system 200 as coded bidding data $C(v)$.

The tender opening system 200 calculates $y(v')$ corresponding to a contract price candidate v', namely its hash value, and calculates $x(v')$ that is the inverse element of $y(v')$ in the modulus $(p-1)(q-1)$, as a decode parameter. Then, $C(v)$ is decoded in the modulus n taking this code parameter as the secret key.

Here, if v=v', the decoding result $M(v')$ will have a correct format for v' and a certain random number. On the other hand, if v v', the decoding result will not have such format. Thus, without revealing the bid itself, it can be determined whether the bid is equal to the contract price candidate.

If the contract price is decided to be v, all offered code bids, and respective result of decoding by the decode parameter $x(v)$ corresponding the possible tender prices that are equal to or larger than v are published by the announcement section. Therefore, all bidders can verify that there was no bid larger than v and identify the successful bidder, since they can confirm that the result coded by the code parameter y(v') corresponding to the contact price candidate is equal to the offered coded bids using the announced decode parameter.

On the other hand, bids inferior to the contract price can be concealed, because the decoding result corresponding to the bids that are less than the contract price are not published. Further, problems in the case where a plurality of successful bidders exist as in the conventional method will not occur, because all bidding sub-systems will be identified, even when obviously a plurality of bidding subsystems have offered the contract price.

Moreover, it is assured that coded bids to be input into the tender opening system exclude those outside the bidding period, by publishing coded bids that are received before the bidding deadline, and opening only the published bids. As this is incidental to the present invention, further detailed description of this feature will be omitted.

Additionally, it can be assured that the tender opening system will not illegally decode the coded bid, such as by controlling or generating different decode parameters using a plurality of sub-systems that employ a distributed secret or group decryption technology or the like. As this feature is also incidental to the present invention, further detailed description will be omitted.

In addition, a digital signature may be used with a coded bid in order to prevent the bidder from bidding in the name of another bidder, or denying responsibility for a transmitted coded bid; however, this feature is also incidental to the present invention, so further detailed description thereof will be omitted.

In the disclosed embodiment, the case where a bidding sub-system that has offered the highest price among bid prices is the successful bidder has been described in detail; however, similarly, the invention may also be applied to the case wherein the lowest price will be the contract price, or to the case wherein a plurality of bidding sub-systems that have offered a bid close to the highest price or the lowest price are treated as winning bidders.

It is to be understood that the present invention is not limited to the aforementioned respective embodiments, and obviously, the respective embodiments can be executed by conveniently modifying them, without departing from the technical concept of the present invention.

As described hereinbefore, according to the present invention, it is possible to provide an electronic tender system that selects the bidder who has offered the highest or the lowest price as successful bidder, and moreover, that maintains the confidentiality of bidding information for bids other than those of the successful bidders, based on a basic composition wherein bidder sub-systems code their bids by means of a code parameter that corresponds to a particular bid value, and the tender opening system decodes by a decode parameter that corresponds to a particular contract price candidate.

What is claimed is:

1. An electronic tender system for accepting as a contract price the highest or lowest price among bids, comprising:
   a bidder sub-system including:
      a predefined set of code parameters in which a different code parameter is associated with each of respective bid amounts within a tenderable range,
      a code parameter acquisition section for acquiring a code parameter from said predefined set of code parameters corresponding to a bid amount selected by the bidder sub-system within a tenderable range,
      a code processing section for encoding the bid selected by the bidder sub-system using the acquired code parameter obtained by said code parameter acquisition section, and
      a transmission section for sending a message including an encoded bid encoded by said coding section to a tender opening sub-system, and
   a tender opening sub-system including:
      a reception section for receiving messages from bidder sub-systems including encoded bids until a closing time,
      a predefined set of decode parameters in which a different decode parameter is associated with each of respective contract price candidates,
      a candidate price selection section for sequentially selecting contract price candidates beginning with one of a highest and a lowest within said tenderable range,
      a decode parameter acquisition section for acquiring from said predefined set of decode parameters a decode parameter corresponding to a contract price candidate selected by the selection section, and
      a determination section for decoding encoded bids using an acquired decode parameter corresponding to a contract price candidate selected by the selection section to determine whether a bid that is the same as the contract price candidate selected by the selection section exists among encoded bids received by the reception section.

2. The electronic tender system as claimed in claim 1, wherein said tender opening sub-system includes an announcement section for announcing one of a portion of a decode parameter acquired by the decode parameter acquisition section and decoding results obtained in the determination section for each contract price candidate.

3. The electronic tender system as claimed in claim 1, wherein the predefined set of code parameters comprises respective public keys each corresponding to a different bid amount, and
   wherein the decoding section of the tender opening sub-system performs a decoding operation using a the predefined set of decode parameters comprises respective secret keys each corresponding to the a respective one of the public keys corresponding to said different bid amounts.

4. The electronic tender system as claimed in claim 3, wherein said tender opening sub-system includes an announcement section for announcing one of a portion of a decode parameter acquired by the decode parameter acquisition section and decoding results obtained in the determination section for each contract price candidate.

5. The electronic tender system as claimed in claim 1, wherein the code processing section of the bidder sub-system encodes a bid value using the code parameter obtained by the code parameter acquisition section from the predefined set of code parameters, and
   wherein the reception section of the tender opening sub-system includes a decoding section for sequentially decoding encoded bids received by the reception section using the decode parameter acquired by the decode parameter acquisition section from the predefined set of decode parameters, and a judgment section for judging that a coded bid is identical to a contact price candidate selected by the selection section when the decoding result is equal to a fixed value.

6. The electronic tender system as claimed in claim 5, wherein said tender opening sub-system includes an announcement section for announcing one of a portion of a decode parameter acquired by the decode parameter acquisition section and decoding results obtained in the determination section for each contract price candidate.

7. The electronic tender system as claimed in claim 5, wherein the predefined set of code parameters comprises respective public keys each corresponding to a different bid amount, and wherein the decoding section of the tender opening subsystem performs a decoding operation using a the predefined set of decode parameters comprises respective secret keys each corresponding to the a respective one of the public keys corresponding to said different bid amounts.

8. The electronic tender system as claimed in claim 7, wherein said tender opening sub-system includes an announcement section for announcing one of a portion of a decode parameter acquired by the decode parameter acquisition section and decoding results obtained in the determination section for each contract price candidate.

9. A method for placing a bid for a contract, comprising:
choosing a bid price to be used in a bid;
obtaining a code parameter associated with the chosen bid price from a predefined set of code parameters in which a different code parameter is associated with each of respective bid prices;
encoding the bid using the code parameter associated with the chosen bid price in the predefined set; and
transmitting a message including the encoded bid to a bid receiving system.

10. The method claimed in claim 9, wherein said predefined set of code parameters comprises respective public keys associated with each bid price in the set.

11. The method claim in claim 10, wherein encoding a bid using the code parameter associated with the chosen bid price comprises encoding the bid using the public key associated with that bid price in the predefined set of code parameters.

12. A method for determining a contract price from received bids, comprising:
receiving a plurality of encoded bids for a contract;
obtaining a decode parameter that is associated with one of a highest and a lowest contract price candidate within a tenderable range of the contract from a predefined set of decode parameters in which a different decode parameter is associated with each of respective contract price candidates;
attempting to decode each of the encoded bids using the obtained decode parameter;
if at least one of the encoded bids is decodeable using the obtained decode parameter, determining that the contract price is equal to a price of said at least one encoded bid; and
if none of the encoded bids is decodeable using the obtained decode parameter, obtaining a next decode parameter from the predefined set of decode parameters that is associated with a next closest contract price candidate with respect to the highest or lowest contract price candidate within the tenderable range of the contract, and attempting to decode each of the encoded bids using the next obtained decode parameter,
wherein said plurality of bids are attempted to be decoded using successive decode parameters corresponding to successive contract price candidates until at least one bid is successfully decoded.

13. The method claimed in claim 12, wherein said predefined set of decode parameters comprises respective secret keys each associated with a corresponding public key used to encode bids of the associated contract price candidate.

14. The method claim in claim 13, wherein attempting to decode each of the encoded bids using the obtained decode parameter comprises attempting to decode each of the encoded bids using the secret key associated with the contract price candidate.

* * * * *